United States Patent

Molo et al.

[15] 3,691,306

[45] Sept. 12, 1972

[54] APPARATUS AND PROCESS FOR DETECTING MALFUNCTIONS IN A FREQUENCY DIVISION MULTIPLEX SYSTEM

[72] Inventors: Francesco Molo, Corso Lodi 59; Alberto Giacometti, via Illirico 12/4, both of Milan, Italy

[22] Filed: July 2, 1970

[21] Appl. No.: 52,054

[52] U.S. Cl. ........................179/15 BF, 179/175.2 C

[51] Int. Cl. ..............................................H04j 1/16

[58] Field of Search. 179/15 BF, 15 BP, 15 R, 15 BY, 179/175 R, 175 A, 175.1, 175.11, 175.3, 175.31

[56] References Cited

UNITED STATES PATENTS

| | | | |
|---|---|---|---|
| 2,733,296 | 1/1956 | Maggio | 179/15 BY |
| 1,794,393 | 3/1931 | Bown et al. | 179/175.3 |
| 2,558,439 | 6/1951 | Hurault | 179/15 BP |
| 2,730,579 | 1/1956 | Case et al. | 179/175.3 |
| 3,508,018 | 4/1970 | Orne | 179/175.3 |
| 3,548,105 | 12/1970 | Anderson | 179/175 R |
| 3,586,993 | 6/1971 | Buck | 179/15 BF |

*Primary Examiner*—William C. Cooper
*Assistant Examiner*—David L. Stewart
*Attorney*—Clario Ceccon

[57] ABSTRACT

A process and an apparatus for automatically detecting malfunctions of an individual channel in a communication system by introducing a test signal onto all of the channels at the transmitting end and sequentialy extracting the test signal and inserting it into the receiving end where it is then detected.

10 Claims, 4 Drawing Figures

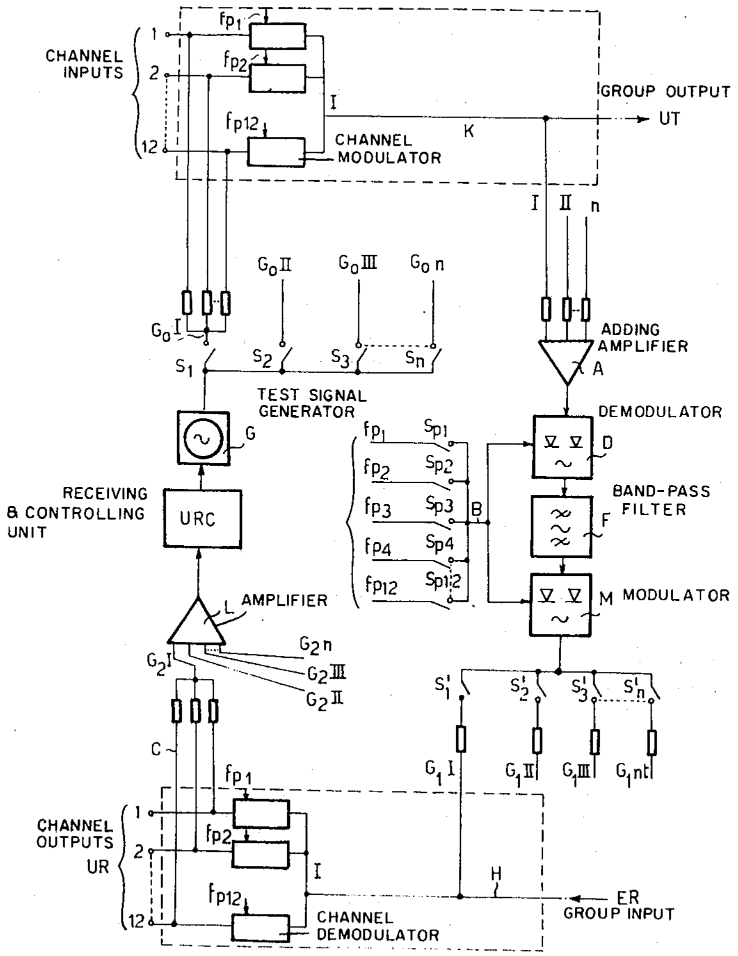

APPARATUS AND PROCESS FOR DETECTING MALFUNCTIONS IN A FREQUENCY DIVISION MULTIPLEX SYSTEM

The present invention relates to a process for automatically detecting malfunctions in frequency multiplexing equipment used on communication channels, and to apparatus.

In multiplexing equipment a first modulating stage has a number of carrier frequencies, generally 12, forming a group, which frequencies, after being modulated by the information from as many channels, is sent along a single output wire. The same equipment comprises a plurality of separated groups using tha same carrier frequencies. If the groups are, for instance, five, 60 channels may be used at the same time.

Now the components relative to each channel (as for instance resistors, inductors, capacitors) may be subjected to casual breakdowns, whereby the channel to which they belong stops operating. The non-working of a channel can be unnoticed for a long time as automatic devices in the system transfer the communications to another channel giving the effect that the troubled one appears to be always busy. The users have the disadvantage of finding the line always busy, while the company managing the service has the damage of losing the profit from the damaged channel.

Generally a manual check of each channel is periodically made, which requires considerable expense and a specialized staff.

It is an object of the invention to locate automatically the defective channel.

The process according to the invention is that pulses having a carrier frequency within the band of the channel, are sent along the channel circuit both in the transmitting and in the receiving direction and then, in normal conditions, they are received by suitable detecting means, whereas, in troubled conditions, their non-arrival operates an alarm signal.

The apparatus according to the invention comprises means for generating a test signal, whose spectrum lies within the communication band, said means being connected, through gate circuits which may be inserted, to the checked channels, so that the check concerns a limited number of channels. Means are included for sending said signal only to one channel in the apparatus and means for drawing the signal at the same time from all multiplexing wires. Further means are included for demodulating, filtering by a narrow band-pass filter and then modulating again the signal, wherein demodulation and modulation are carried out by using one of the carriers employed in channel modulation. The apparatus also comprises means for sending the processed signal along the multiplexing wires of the receiving side of the apparatus and means for drawing and detecting the signals which may be present at the communication output from the receiving side of the apparatus, and also a control check and alarm unit.

The invention will be more readily understood with reference to the accompanying drawings, in which.

The invention is particularly applied to equipment for multiplexing telephone channels by frequency division, in correspondence with the first channel modulation stage for realizing the base groups.

As it is known, in the equipment for multiplexing telephone channels by frequency division, the information signal within the base band is frequency shifted in a first stage so as to have 12 channels within the band 60 – 108 KHz which realizes the primary group.

The multiplexing of a number of channels is carried out by means comprising amplitude modulation circuits, filtering means and amplifying circuits.

These circuits, when operating, may be subjected to breakdowns. A manual check periodically made (for instance every month), as it occurs at present, is expensive. On the contrary the automatic check according to the invention is cheap and therefore it can be repeated very often.

Figure 1:
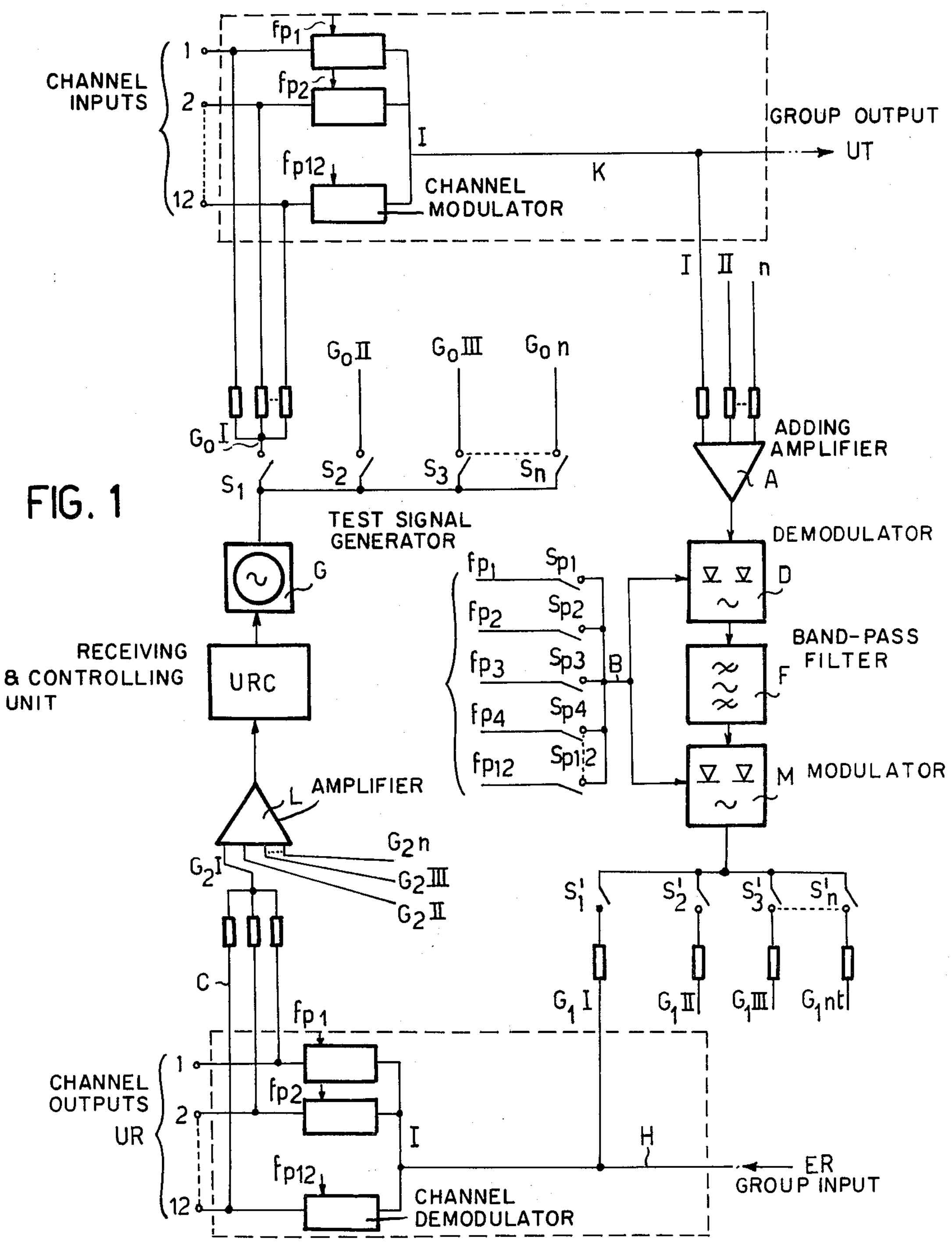
FIG. 1 is a diagram of a first embodiment of the invention.

FIG. 1 relates to the case of multiplex equipment having 60 channels divided into five groups of 12 channels each. As it will become apparent from the following description, the number of the groups, as well as the number of channels in each group, may be varied at will.

In the drawings, the upper portion relates to the transmitting circuits, which are of known type and the lower portion relates to the receiving circuits, which are also of known type. The central portion shows the device according to the invention for automatically locating and indicating the troubles which may occur in one or more channels.

In ET there is the input of 12 distinct channels at voice frequency, each of them modulating a different carrier frequency fp1, fp2 . . . fp12, shown by arrows, coming from a carrier frequencies generator, so that 12 separated spectra are obtained which then may be sent along the same wire K towards the output UT of the first group.

The same scheme is repeated as many times there are groups, for instance five as it has been supposed.

The same channel modulation frequencies fp1, fp2 . . . fp12 are used for all groups.

The five outputs UT are mixed together (by means of a group modulation, not shown) so that at the final output from the apparatus five groups, each having 12 different frequency bands, will be present on a single wire.

A similar arrangement, used in the opposite direction, is present at the receiving side.

A first group demodulation circuit separates the frequency bands forming each group and sends to ER along the wire H the ones relative to the first group. These ones are then demodulated by the same frequencies fp1, fp2 . . . fp12, so that the 12 channels at voice frequency are obtained at UR.

This portion of the scheme from ER to UR, is repeated as many times as there are groups.

On the other hand the portion which realizes the device according to the invention is single, and is cyclically switched to each group, and, to each channel within each group.

The central portion of the device is the receiving and controlling unit, shown by URC, which is connected to a generator G whose output is fed to a plurality of gates $S_1, S_2 \ldots S_n$, all having an output connected respectively to one of the groups of 12 channels, shown by $G_{oI}$, $G_{oII} \ldots G_{oV}$, all fed in parallel to one another.

The wire K leading to the output UT is connected in all groups to the input of an adding amplifier A acting also as a decoupler for every single group.

The output from the amplifier A is connected to a demodulator D, connected in turn to a wire B to which the carrier frequencies $fp_1$, $fp_2$ . . . $fp_{12}$, each controlled by a gate $Sp_1$, $Sp_2$ . . . $Sp_{12}$, arrive in parallel. The output from the demodulator D is connected to a narrow, band pass filter F, downstream of which there is a modulator M, also connected to the wire B.

The output from the modulator M, is connected to five groups $G_{1\,1}$, $G_{1\,11}$ . . . $G_{1\,n}$, and specifically to the wire H of each of them through the set of five gate circuits $S'_1$, $S'_2$ . . . $S'_n$ in parallel.

Every group generates 12 individuals voice channels at the terminal UR. Each of said channels is connected, through the corresponding wire C, to a wire $G_{21}$, $G_{2\,11}$ . . . $G_{2n}$ feeding an amplifier L connected finally to the unit URC whence the description began.

The connections between URC and the three sets of gates $S_1$ . . . $S_n$; $S'_1$ . . . $S'_n$; $Sp_1$ . . . $Sp_n$ have not been shown for clearness of the drawing.

Also the structure of the unit URC has not been shown, both for simplifying the drawing, and because it can be realized in several ways according to the design techniques of logic circuits.

It will be sufficient for those skilled in the art to point out the functions of this unit, which are a. operating the generator G;

b. opening cyclically the pairs of gates S1, S'1; S2, S'2; . . . $S_n$, $S'_n$ for sequential times, each pair corresponding to a group of 12 channels;

c. dividing the opening time of each of said pairs of gates into 12 sequential intervals, each of them corresponding to one of the 12 carrier frequencies $fp_1$ . . . $fp_{12}$, and, in correspondence with each of said intervals, opening the corresponding gates $Sp_1$, $Sp_2$ . . . $Sp_{12}$;

d. detecting a signal present at the output from the amplifier L;

e. blocking the sequential opening of the three sets of gates and operating a sound and/or visual alarm in case the output signal from L fails.

Figure 4:
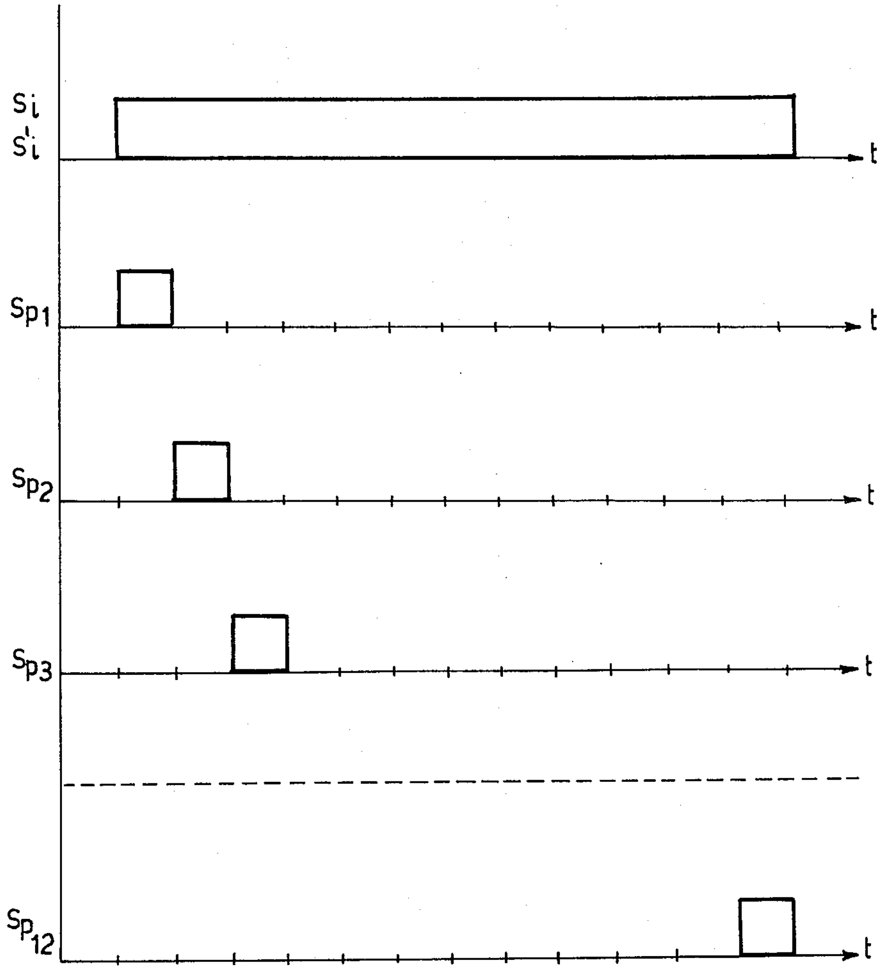
FIG. 4 is a diagram of the opening and shutting of the gate circuits used in the device.

One of the opening times of the gates $S_1$, $S'_1$, and its division into intervals corresponding to the opening of the single gates $Sp_1$ . . . $Sp_{12}$ are shown in FIG. 4.

The operation of the described device is as follows.

Whether the usual telephone apparatus is operating, or it is not in use, when it is desired to carry out a check, the unit URC is operated, which operates the generator G. The output signal from this generator goes to the input of the gates S1 . . . $S_n$ one of which, for instance S1, is open, whereas the others are closed. The signal then enters the 12 channels of the first group, mixes with the voice signal, if it is present, and is shifted by the carrier frequencies $fp_1$ . . . $fp_n$ into 12 different, one for each channel, which positions are all on the wire K and therefore in the amplifier. At the instant of operation, within the opening time of the gate $S_1$, one of the gates $SP_1$ . . . $Sp_{12}$ will be open, for instance $Sp_3$. Therefore, only one of the 12 carrier frequencies which may be connected to the wire B is connected through the gate $Sp_3$. Such a frequency demodulates the 12 signals at the output from A, with the result that the signal corresponding to the channel 3 produces the test frequency of the generator G, whereas the other 11 ones disappear as they cannot pass through the narrow band filter F.

The frequency that has passed is modulated again in M by the same frequency $fp_3$ and, at the output from M, it is fed to the gates $S'_1$ . . . $S'_n$, which all could pass it to a different group, but, as only the gate $S_1$ (operating in synchronism with S1) is open, said frequency will be sent to the group 1, where it mixes on the wire H with the reception signal — if any — coming from ER. Going further towards UR the signal is demodulated again by the frequency $fp_3$. It is fed to the wire C of the corresponding channel, then to the amplifier L and at last it arrives to the unit URC. If the described operation doesn't occur because of a trouble in the transmitting or in the receiving set, the unit URC doesn't receive this signal and operates the alarm while stopping at the same time the cyclical opening of the gates $S_1$ . . . $S_n$ and respectively $Sp_1$ . . . $Sp_n$.

In the supposed case, the last open gate in the first set was S1, and in the second set is $Sp_3$. Therefore, the trouble concerns the first group and specifically the third channel.

The test signal doesn't affect the operation of the equipment. In practice it is suitable for the generator G to have a low output impedance and to be connected to the channels by means of a high impedance.

Similarly the amplifier A must have a low input impedance and a high impedance in series with its connections.

Figure 2:
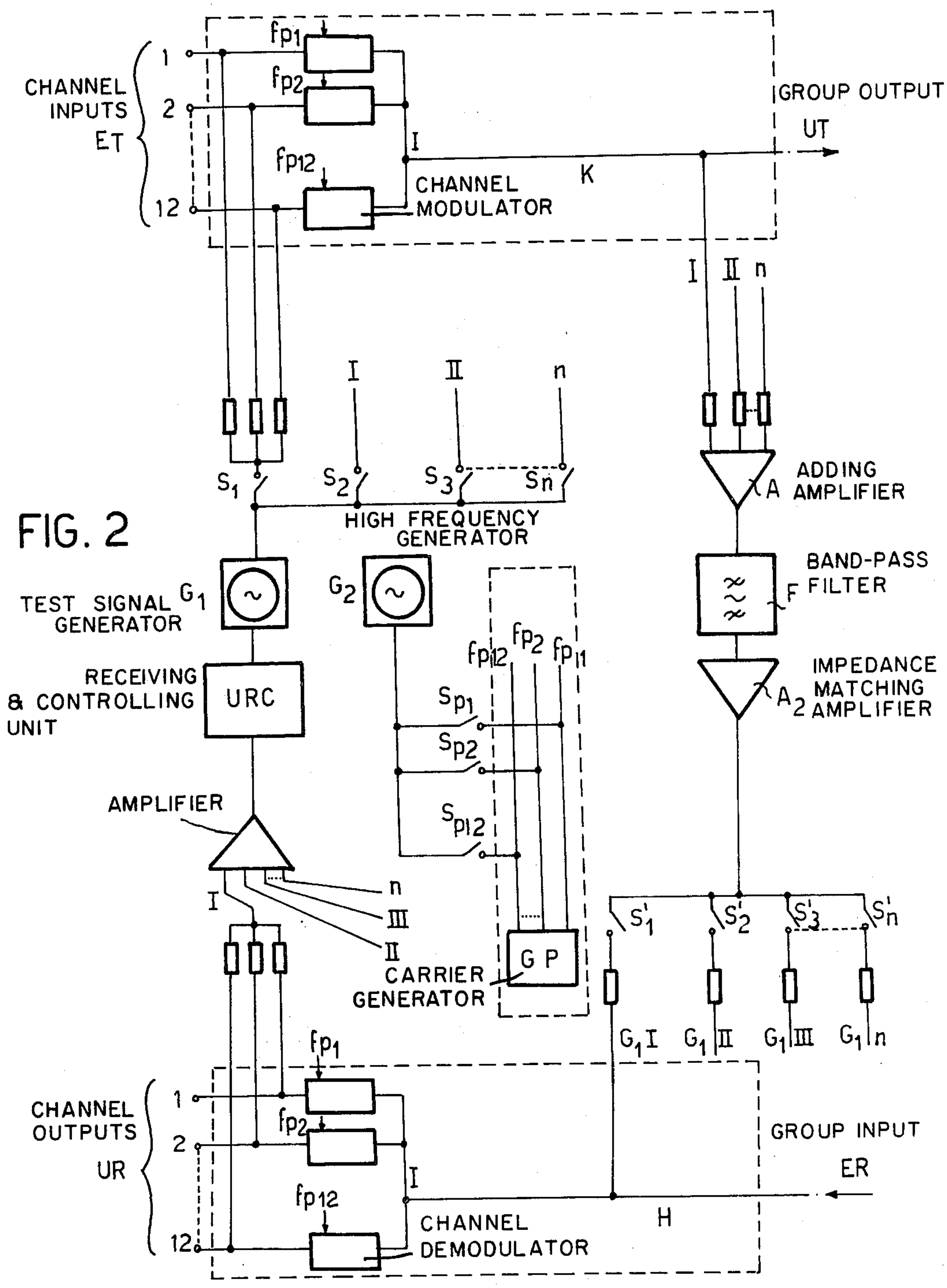
FIG. 2 and 3 are modifications thereof.

The embodiment of FIG. 2 has the following modifications:

there is a generator $G_2$ having a frequency higher than the carrier frequencies $fp_1$ . . . $fp_{12}$ generated by the carrier generator $G_p$. The output of $G_2$ being multiplexed over 12 paths each individually connected through an inserted gate circuit $Sp_1$ to a single wire leading the carrier frequency to the channel modulation circuits. Said gate circuits are operated in the same way described in connection with FIG. 1.

The modulator and the demodulator are no longer necessary, and are replaced by an impedance matching amplifier $A_2$.

The operation of the circuit shown in FIG. 2 is as follows.

Whereas in the embodiment of FIG. 1 the test signal, generated by the generator G, was modulated by the carrier frequencies fp1, fp2 . . . fp12 and therefore lay within the band of the base group, in the embodiment of FIG. 2 the signal from the generator G1 modulates the usual channel carrier frequency, and at the same time — for the channel for which at a certain time the gate Sp is open — it modulates also the signal from the generator G2, whose frequency is added to the carrier frequency of that channel.

Because of this operation, a signal is obtained which is located at a frequency depending only on the frequency of G2 and G1, and not on the channel carrier frequency fp1 . . . fp12.

It is therefore possible to draw this signal by means of the narrow band filter F adjusted for said frequency value.

The rest of the process is as already described.

Figure 3:
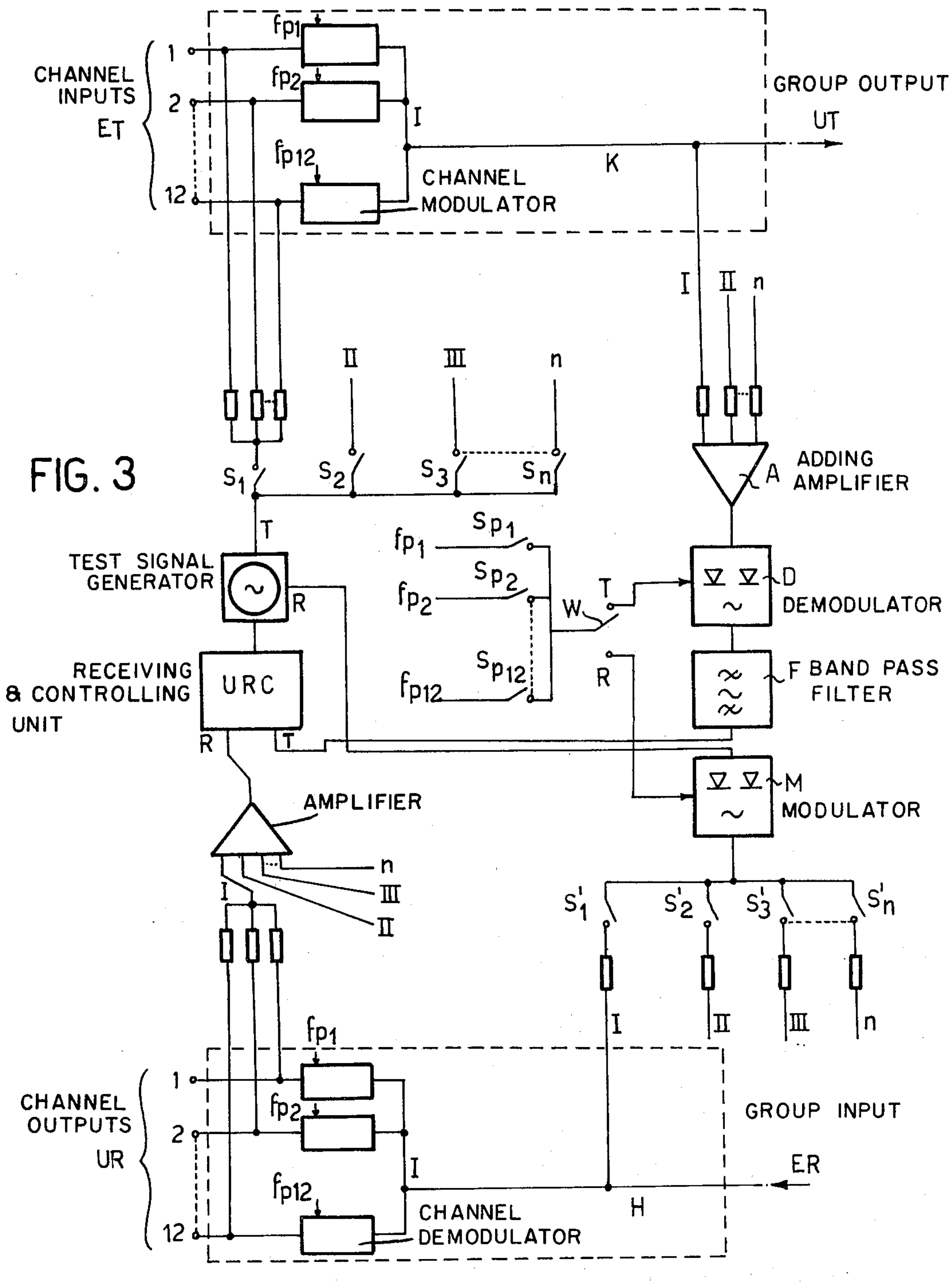

In the embodiment of FIG. 3 it is possible to check separately whether a predetermined channel has a trouble at the transmitting or the receiving side.

In this case the generator of the test signal has an output T and an output R which are within different frequency bands.

The output T is connected to the low frequency input of the channel modulation circuits at the transmitting side, and the output R is directly connected to a modulator M wherein the injection ot the carrier occurs in the way described in connection with FIG. 1.

The test signal receiving unit has two inputs too. One of said inputs being connected to the low frequency output of the channel circuits at the receiving side as it is shown in FIG. 1, the other input being connected to the output of the band-pass filter.

A switching circuit W allows the selected carrier frequency to be sent from one gate to either the modulator of the receiving test circuit R or to the demodulator of the transmitting test circuit T.

The reception of the signal allows one to verify that the transmitting or the receiving part (according to the position of the switching circuit W) are in working order.

The described devices do not affect the normal operation of the channel circuits, and don't generate cross-talk between them.

The points wherein the check signal is inserted or drawn, both in high and in low frequency, are realized so that they have high cross- talk damping between the channels and low transmission damping for the test signal.

What is claimed is:

1. A process for automatically detecting malfunctions of an individual communications channel within a communication system wherein a plurality of such channels containing information modulate a respective plurality of carrier frequencies which are then frequency multiplexed as a high frequency output signal onto a transmitting line, received as a high frequency input signal by a receiver, decoupled, demodulated and the information recovered, and including a local transmitter and receiver, the steps comprising;

a. generating a test signal whose frequency lies within the communication bandwidth;
b. applying the test signal to all the channels;
c. sequentially extracting the test signal locally from each individual channel from the high frequency output and inserting it into the high frequency input;
d. detecting the presence of extracted test signal from the recovered information, and
e. triggering an alarm at the absence of a test signal.

2. A process as in claim 1 wherein said step of extracting the test signal locally further comprises the steps of:

a. demodulating a test sample of the high frequency output with one of said plurality of carrier frequencies;
b. filtering the demodulated signal to extract the test signal; and
c. modulating the filtered signal with the same carrier frequency.

3. A process as in claim 1, wherein said communication system comprises a plurality of groups each group containing a plurality of channels frequency division multiplexed together, and wherein said step of applying the test signal includes the steps of:

a. applying the test signal to all channels within a group, and
b. maintaining said test signal until all channels in the group have been tested.

4. A process as in claim 1 further including the steps of:

a. generating a new high frequency carrier signal;
b. applying the new carrier signal sequentially to each channel to be modulated by the channel information, and
c. combining said test signal with said new carrier signal as the signal to be extracted.

5. A process as in claim 1, wherein said extracted test signal is detected directly from the transmitting line, and a second test signal is introduced directly into said high frequency input.

6. A device for automatically detecting malfunction of an individual communication channel within a communication system wherein a plurality of such channels containing information modulate a plurality of carrier frequencies which are then frequency multiplexed as a high frequency output signal onto a transmitting line, received as a high frequency input signal by a receiver, decoupled, demodulated and the information recovered, comprising a. generator means for applying a test signal in parallel to said plurality of channels;
b. means to sequentially extract locally said test signal from each individual channel of the high frequency output signal;
c. testing means to detect the presence of said locally extracted test signal and
d. alarm means triggered by the absence of said test signal.

7. A device as in claim 6, wherein said means for extracting further comprises:

a. decoupling and amplifying means connected to said transmitting line;
b. demodulator means connected to said last mentioned means and supplied sequentially with each of said plurality of carrier frequencies;
c. filter means connected to the output of said demodulator means for passing only the output from said generator means,
d. modulating means connected to the output of said filter means and supplied with the same carrier frequency applied to the demodulator means, and
e. local transmitter and receiver means for inserting the output from said modulating means into the high frequency input, and wherein said testing means is connected to the recovered information.

8. A device as in claim 7 wherein said communication system contains a plurality of groups each containing said plurality of channels which are frequency division multiplexed to form said groups, and further comprising:

a. first gate means having a gate for each group and connected between the generator means and the plurality of channels;
b. second gate means having a gate for each group and connected between the modulating means and the local transmitter;
c. third gate means having a number of gates equal to the number of channels in each group; and d. sequential controlling means for timing the operation of said gate means such that said first and second gate means are set for the same group and said third gate means sequentially closes all the gates therein while said first and second gate means remains set, said third gate means supplying the carrier frequencies to said modulating means and demodulator means.

9. A device as in claim 6 further including a second generator having a frequency higher than said frequencies whose output is sequentially applied to each channel to be modulated by the channel information, said testing means testing for the combination of outputs from both generators.

10. A device as in claim 6, wherein said testing means tests for said output directly from said transmitting line, said generator output is also sequentially applied to each channel at said receiver, and said testing means also tests for said output from said receiver.

* * * * *